Feb. 21, 1967 D. G. BERUBE 3,305,719
FAILSAFE STARTING SYSTEM FOR CHRONOMETRICALLY GOVERNED MOTOR
Filed April 3, 1964
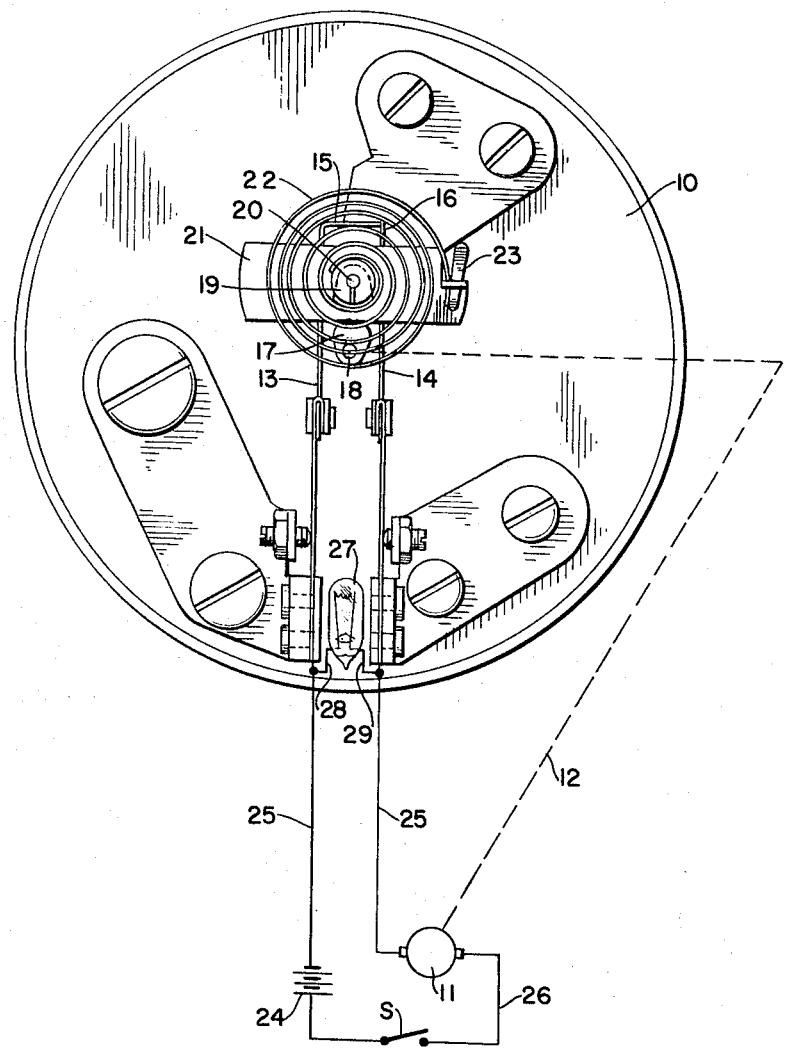
INVENTOR.
DONALD G. BERUBE
BY
Mandeville & Schweitzer
ATTORNEYS

3,305,719
FAILSAFE STARTING SYSTEM FOR CHRONO-METRICALLY GOVERNED MOTOR
Donald G. Berube, Waterbury, Conn., assignor to Consolidated Electronics Industries Corp., Waterbury, Conn., a corporation of Delaware
Filed Apr. 3, 1964, Ser. No. 357,187
2 Claims. (Cl. 318—311)

The present invention relates to governed motors and more particularly to a novel and simplified failsafe starting system for so-called chronometrically governed D.C. motors of the type disclosed in the U.S. patents, No. 2,523,298, September 26, 1950, and No. Re. 24,310, April 30, 1957, issued to A. W. Haydon.

In general, the patented devices utilize a D.C. motor arranged to be driven at a speed somewhat greater than a desired, predetermined speed. A pair of governor contacts are included in the power circuit to the motor winding and are opened periodically at instants determined by the travel (instantaneous speed) of the motor. Associated with the governor contacts is a constant frequency device, such as a balance wheel mechanism, which permits or causes the contacts to be closed cyclically at regular intervals determined solely by its constant frequency.

In contrast with conventional governors employing centrifugal contacts which open only above certain motor speeds, the governor contacts of a "chronometric" governor of the above-described type are opened and closed at all motor speeds to provide energizing power pulses to the motor winding. The duration of the periods of contact opening and contact closing determines the duration or "duty cycle" of the power pulses and will be a function of the associated constant frequency device and the instantaneous speed of the motor itself. In the maintenance of a predetermined, desired motor speed, a constant pulse rate is maintained. However, the instantaneous pulse duration will be appropriately increased when the applied voltage is decreased or when the externally connected load is increased. Conversely, a decrease in load or increase in applied voltage will cause the instantaneous pulse duration to be shortened.

In the described system, the motor is caused alternately to accelerate momentarily to speeds slightly above the predetermined, desired speed during the "duty cycle" period of closed contacts, and to decelerate momentarily to speeds slightly below the predetermined, desired speed during the period of opened contacts. The manner of operation is such that the average speed of motor operation is maintained with great precision substantially at the predetermined, desired speed. Accordingly, "chronometrically" governed motors have had widespread use and great acceptance in timing applications requiring high precision and accuracy.

In its desired, normal operation and upon the opening of an external energizing circuit, the chronometrically governed motor is designed so that, when it comes to rest, its governor contacts are in a closed condition, in which condition the motor may be readily re-started by the reclosing of the external energizing circuit. However, in some instances contamination of the governor contacts will prevent proper completion of the energizing circuit, and hence reliable self-starting may not be realized with conventional circuitry.

Accordingly, it is an object of the present invention to provide a novel and simplified failsafe energizing system for reliably starting a chronometrically governed motor regardless of the condition of the governor contacts. It is a further object to provide a failsafe starting system which, in addition to providing positive self-starting, will sufficiently limit the current supplied to the governed motor after starting and during normal governing to prevent runaway of the motor from governed speeds.

Specifically, the failsafe starting system of the invention utilizes a small incandescent control lamp, having predetermined non-linear resistance characteristics, connected in shunt relation to the governor contacts. When the motor energizing circuit is initially closed, the cold control lamp presents a near-zero shunt resistance, so that full source voltage is momentarily supplied to the motor for reliable self-starting. As the motor approaches governed speed, the lamp becomes incandescent and its resistance increases significantly, so that the applied voltage is adequately reduced during open contact periods to effectively avoid motor runaway. Certain other features and advantages of the invention will be apparent from the following detailed description taken in conjunction with the accompanying drawing depicting a preferred embodiment of the invention.

For the purposes of illustration, the invention has been shown in an embodiment which includes a chronometric governor as generally described and claimed in the A. W. Haydon United States Patent No. Re. 24,310. Only so much of that mechanism as is necessary for a full understanding of this invention will be described herein, and the reader is directed to the patent for a more complete description.

In the specific mechanism illustrated in the drawing, a base plate 10 is mounted directly on the end of the housing of the motor to be governed. The motor is shown schematically at 11 and its driving connection to the governor mechanism is indicated by broken line 12. As actually constructed, the motor and the governor mechanism are preferably contained within a common housing, as will be understood.

A pair of spring contact elements 13 and 14 are separately mounted on the base plate and electrically insulated from each other. An L-shaped contact 15 is formed at the free end of the spring contact 13, and a cooperating contact portion 16 is formed at the free end of the spring contact 14. The spring contact elements are so positioned that their contact portions are normally closed.

In accordance with known principles of the chronometrically governed motor, a cam 17 is mounted on a shaft 18, which is driven by the motor 11, either directly from the output shaft of the motor or through a suitable gear reduction train. The cam 17 is positioned between the spaced, parallel portions of the spring contact elements 13, 14 and, as it is rotated by the motor-driven shaft 18, the lobe of the cam 17 alternately engages and displaces the spring contact elements 13, 14. However, the contours of the cam are such that the outward displacement which it imposes on either of the spring contact elements 13 or 14 is not sufficient by itself to cause a separation or opening of the contacts.

A suitable constant frequency device, typically a balance wheel and hairspring system, drives a control cam 19 which cooperates with the motor-driven cam 17 to effect controlled opening and closing of the contact elements. The illustrated arrangement includes a shaft 20 positioned between the contact elements 13, 14. An inertial member 21 which may be an elongated rectangular bar, is fixed to the shaft 20. A hairspring 22 is anchored at its inner end, while the other end is attached to the balance member radially outward from its center, as by means of a wedge 23. The combination of the rotatably mounted balance member and the hairspring forms an oscillating system having a predetermined constant frequency.

The control cam 19 is fixed to the balance member 21 to oscillate therewith and, like cam 17, is arranged to engage alternately the spring contact elements 13, 14. In this respect, the centers of rotation of both cams 17, 19 lie on a line normally midway between the spring contact elements and, as explained in greater detail in the A. W. Haydon patent referred to above, the maximum displacement of the control cam, relative to the maximum displacement of the motor-driven cam, is such that, when either of the contact elements is displaced to the maximum extent by the motor-driven cam, the control cam may pass freely to and through its position of maximum displacement. The frequency of oscillation of the inertia member 21 and control cam is designed to be such that, in cooperation with the desired period of rotation of the motor-driven cam 17, the contact elements are opened cyclically for appropriate periods as long as the rotational speed of the motor-driven cam (and hence the rotational speed of the motor) tends to exceed the predetermined governed speed. More specifically, the net effect of this arrangement is to cause the closing of the contacts 15, 16 at regular, periodic intervals determined by the constant frequency device, and the opening of the contacts thereafter at instants determined by the instantaneous travel or speed of the motor, as influenced by variations in the load and voltage.

Thus, for example, when the supply voltage diminishes or the load increases, the contacts will be opened later with respect to the regular cycle of the constant frequency device to obtain a greater energizing pulse duration or "duty cycle." Conversely, when the supply voltage has been increased or the load decreased, the contacts will be opened earlier with respect to the regular opening cycle, to shorten the pulse duration or "duty cycle". Power for the motor is provided by means of the battery 24 or any other suitable D.C. source, and it must, of course, be sufficient to cause the motor to tend to run at some speed greater than the predetermined desired speed.

In the illustrated system, the D.C. motor 11 is, advantageously, of the type having a permanent magnet core and a wound rotor, such as disclosed in the United States patent to A. W. Haydon, No. 2,513,410. One of the motor brushes is connected by a conductor 25 to the contact elements 14, 13 and to one side of the source 24. The other brush is connected through a conductor 26 and a start switch S to the other side of the D.C. source 24.

In accordance with the principles of the invention, a miniature incandescent control lamp 27, having a low resistance (approaching zero) when "cold" or unlighted and a predetermined high resistance when "hot" or lighted, is connected in shunt relation to the governor contacts by conductors 28, 29. Advantageously, the control lamp 27 is of small enough physical size to be included within the physical confines of the motor housing without interfering in any way with the conventional construction or operation of any of the motor or governor elements.

In an advantageous specific application, the motor 11 may be an A. W. Haydon Co. (Division of Consolidated Electronics Industries Corp.) model H-5626 motor incorporating the invention of U.S. Patent No. 2,513,410. The motor is energized by a D.C. voltage source (battery) of approximately 4 to 6 volts. The control lamp 27, which, advantageously, has a resistance of approximately zero ohms when cold and approximately 102 ohms when hot and under maximum (near 6 volt) voltage, may be a CM8-661 lamp, manufactured by the Chicago Miniature Lamp Works.

The following test data was taken on an H-5626 governed motor with a CM 8-661 lamp connected as shown in the drawing.

| Voltage Applied, volts | Motor Voltage (average) volts | Voltage Drop Across Lamp, volts | Lamp Resistance (approximate) ohms |
|---|---|---|---|
| 4 | 3.3 | .7 | 48 |
| 5.4 | 3.34 | 2.06 | 90 |
| 6 | 3.35 | 2.65 | 102 |
| 6.6 | 3.3 | 3.3 | 112 |

Maximum torque of the motor, with a one r.p.m. gear-reduced output, may be on the order of 15 ounce-inches. The governor mechanism may be a 900 beat system, in which case motor speed correction occurs 900 times per minute.

Starting and stopping of the motor 11 may be controlled by the start switch S in the external power circuit. Normally, when the motor is stopped by opening the switch, the governor contacts 15, 16 tend to come to rest in the closed position, as shown in the drawing. However, on occasion, due to contamination of the contacts or otherwise, the governor contacts may come to rest in an open-circuit condition or at least form a high resistance connection. By design, the contacts tend to be self-cleaning when the motor is in use, but oxides or other contaminants may appear at times on the contact surfaces to hamper start-up. It is in these abnormal situations that the failsafe control lamp 27 ensures proper starting of a motor having opened contacts or high resistance contact connections.

When the control lamp 27 is cold, as before motor startup, its resistance is extremely low (approaching zero ohms, for example), and it accommodates the surge of sufficient current therethrough from the 4-6 volt D.C. battery source to provide positive starting and acceleration of the motor upon the closing of the switch S, even though the governor contacts are open at start-up. However, as the lamp 27 quickly heats up, its resistance increases to a predetermined value (102 ohms, for example, with a 6 volt source) which prevents over-acceleration or runaway of the motor, which may otherwise tend to occur under over-voltage conditions. Thus, after the control lamp 27 has become warm (which occurs almost immediately, but after start-up) and the governor contacts are open, as will periodically be the case in normal governing operation, the motor will be supplied with a desirably reduced amount of current (due to the relatively high resistance of the lamp) which is reliably insufficient to cause the motor to operate at the predetermined, desired speed. Therefore, the control lamp will assure the proper governing of the motor after start-up while providing for reliable self-starting under all conditions. The net effect of the fail-safe control lamp on the operation of the motor is the provision of a very low resistance circuit and adequate applied voltage at starting regardless of the condition of the governor contacts and, thereafter, the provision of a circuit having sufficient resistance to prevent motor runaway by providing sufficient and significant differences in the voltages applied to the motor in the periods of opened and closed contacts during chronometric governing.

A chronometrically governed D.C. motor system having a failsafe control lamp combined therewith in accordance with the invention provides a simple, inexpensive, efficient, and highly reliable mechanism which is well suited for precision timing and other similar applications where reliable operation is required.

Although the present invention has been described with reference to a particular embodiment, it is to be understood that modifications may be made by persons skilled in the art without departing from the spirit or from the scope of the appended claims.

I claim:
1. In a chronometrically governed motor system having a motor winding and an energizing source adapted to drive the motor at speeds in excess of a predetermined, desired speed,

(a) a pair of governor contacts for connecting said winding and said source,
(b) said contacts being operatively associated with and being periodically closable in accordance with the state of a constant frequency device,
(c) said contacts being operatively associated with and periodically openable in accordance with the travel of said motor,
(d) an incandescent lamp connected in parallel, shunt relation to said contacts,
(e) said incandescent control lamp having non-linear resistance characteristics,
(f) said control lamp having a relatively low resistance when cold and a relatively high resistance when heated,
(g) whereby said control lamp provides a low resistance shunt circuit across said contacts when said lamp is cold to accommodate substantially full voltage energizing of said motor regardless of the condition of said contacts at starting,
(h) said relatively high resistance being of a predetermined value to limit said motor speeds to predetermined values less than the desired, predetermined speed of said motor.

2. In a chronometrically governed motor system having a motor winding and an energizing source adapted to drive the motor at speeds in excess of a predetermined, desired speed,
(a) a pair of governor contacts for connecting said winding and said source,
(b) said contacts being periodically closable,
(c) said contacts being operatively associated with and periodically openable in accordance with the travel of said motor,
(d) an incandescent lamp connected in parallel, shunt relation to said contacts,
(e) said incandescent control lamp having nonlinear resistance characteristics,
(f) said control lamp having a relatively low resistance when cold and a relatively high resistance when heated,
(g) whereby said control lamp provides a low resistance shunt circuit across said contacts when said lamp is cold to accommodate substantially full voltage energizing of said motor regardless of the condition of said contacts at starting,
(h) said relatively high resistance being of a predetermined value to limit said motor speeds to predetermined values less than the desired, predetermined speed of said motor.

References Cited by the Examiner
UNITED STATES PATENTS

| | | | |
|---|---|---|---|
| Re. 24,310 | 4/1957 | Haydon | 318—311 |
| 2,912,633 | 11/1959 | Nebinger et al. | 318—325 X |
| 3,038,110 | 6/1962 | Paist | 318—325 |
| 3,184,671 | 5/1965 | Riggs | 318—325 |

ORIS L. RADER, *Primary Examiner.*
J. C. BERENZWEIG, *Assistant Examiner.*